Figure 5:
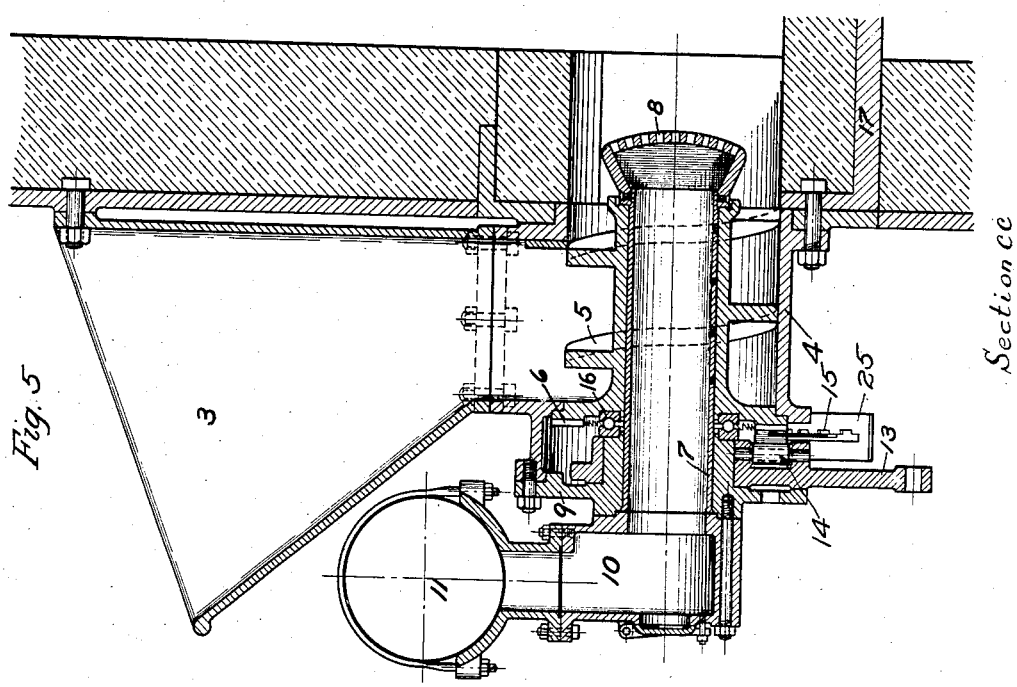

D. F. NISBET.
FUEL FEEDER FOR FURNACES.
APPLICATION FILED JUNE 25, 1908.
910,305.
Patented Jan. 19, 1909.
4 SHEETS—SHEET 1.
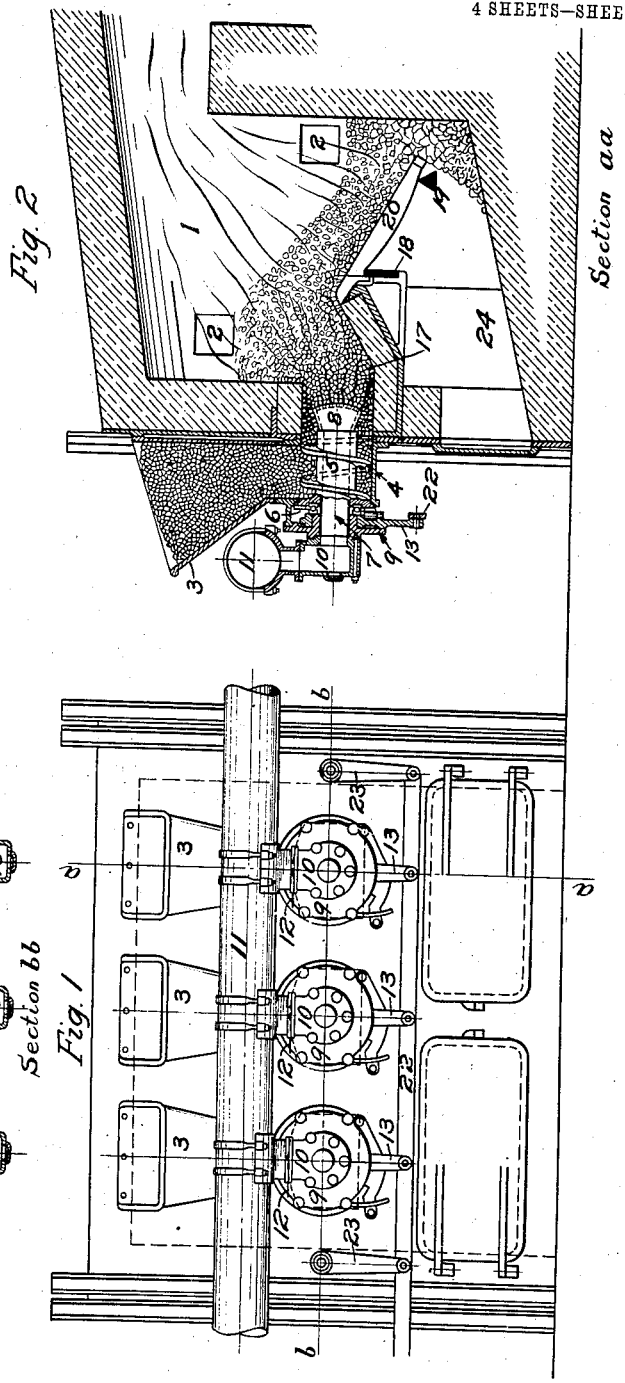
WITNESSES
Ernest Francke
F. S. Nisbet
INVENTOR
David F. Nisbet
BY
Wm C. McIntire
ATTORNEY

D. F. NISBET.
FUEL FEEDER FOR FURNACES.
APPLICATION FILED JUNE 25, 1908.

910,305.

Patented Jan. 19, 1909.
4 SHEETS—SHEET 2.

WITNESSES
Ernest Francke
F. S. Nisbet

INVENTOR
David F. Nisbet
BY
Wm. C. T. W. McIntire
ATTORNEY

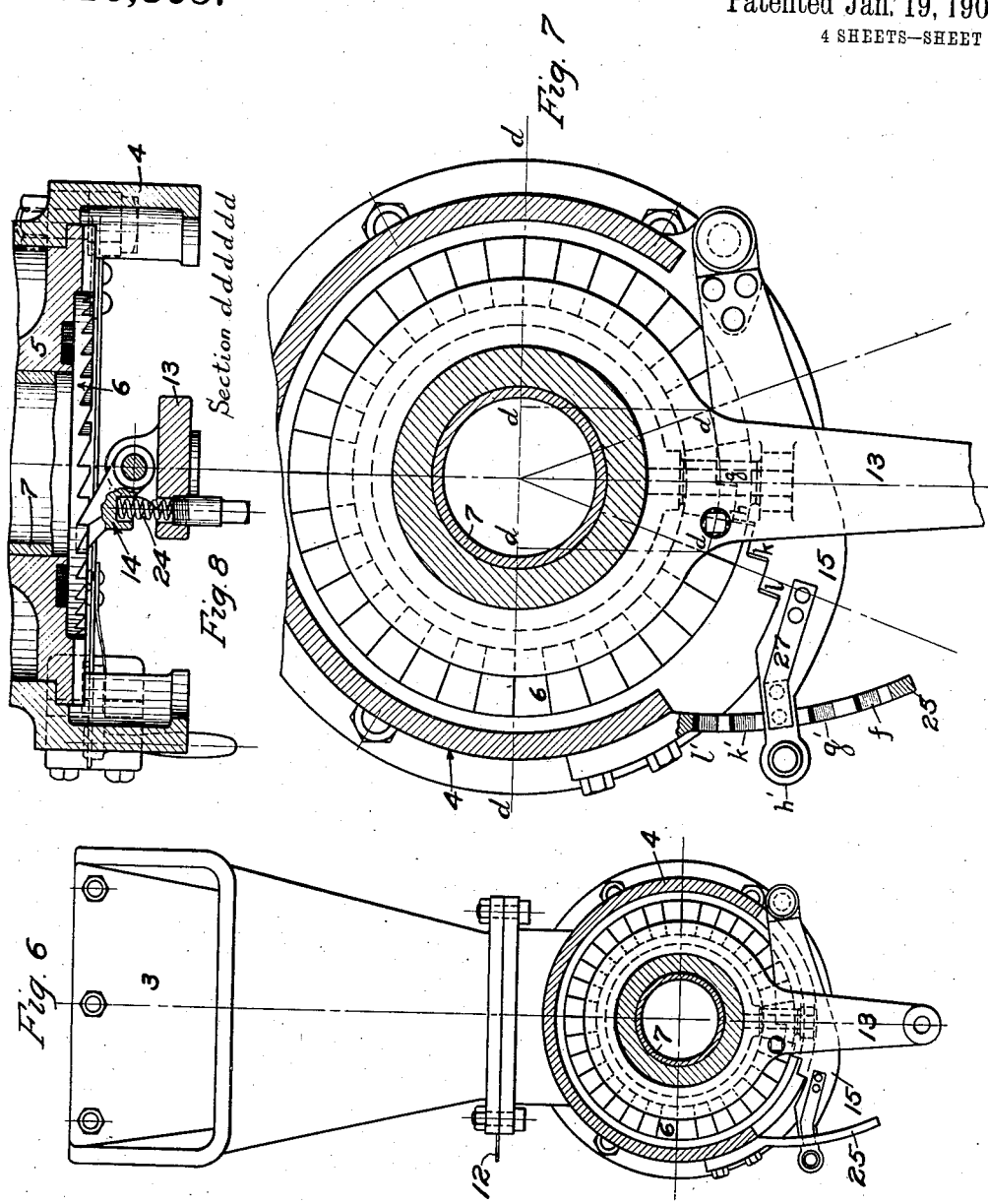

D. F. NISBET.
FUEL FEEDER FOR FURNACES.
APPLICATION FILED JUNE 25, 1908.
910,305.
Patented Jan. 19, 1909.
4 SHEETS—SHEET 4.
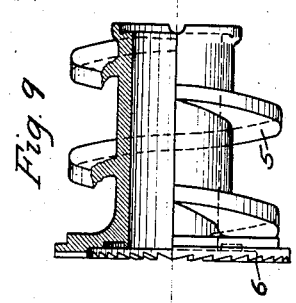
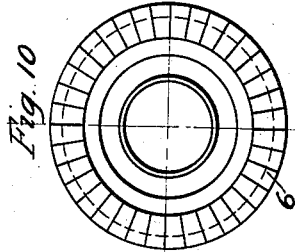
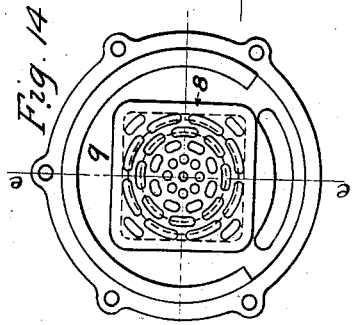
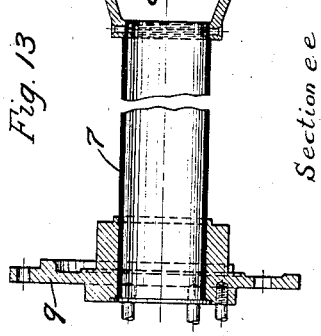
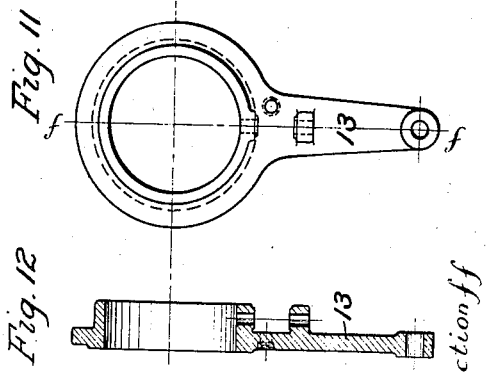
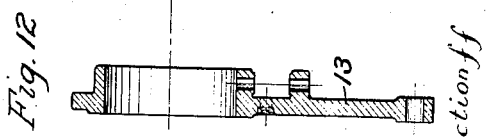
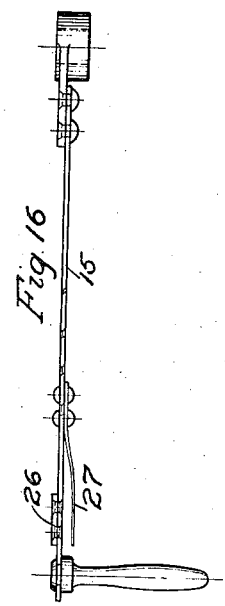
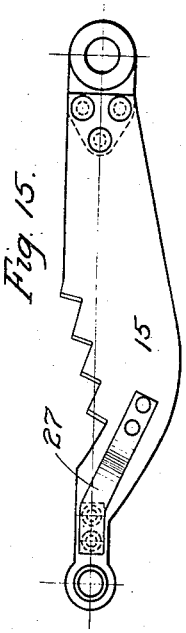
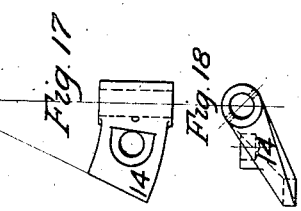
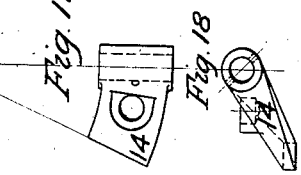
WITNESSES
Ernest Francke
F. S. Nisbet
INVENTOR
David F. Nisbet
BY
Wm C. McWSnair
ATTORNEY

UNITED STATES PATENT OFFICE.

DAVID F. NISBET, OF WILKINSBURG, PENNSYLVANIA.

FUEL-FEEDER FOR FURNACES.

No. 910,305.

Specification of Letters Patent.

Patented Jan. 19, 1909.

Application filed June 25, 1908. Serial No. 440,263.

*To all whom it may concern:*

Be it known that I, DAVID F. NISBET, residing in Wilkinsburg, in the county of Allegheny, State of Pennsylvania, have invented new and useful Improvements in Fuel-Feeders for Furnaces, of which the following specification, in connection with the accompanying drawings, is a full and concise description.

My invention relates to improvements in the type of fuel feeding devices usually classed as underfeed stokers, and though primarily designed for use with direct coalfired metallurgical furnaces, it is readily adaptable to boiler furnaces or any other type.

My invention consists broadly in the method of feeding fuel to furnaces in such manner that the fuel will be massed in front of the burning or fire zone of the grate and supplied at such locality with a suitable quantity of oxygen in order that the hydrocarbons in such mass will be distilled and mixed with the oxygen and constitute auxiliary fuel in the fire zone to the heat generated from the fixed carbons.

My invention also consists in such a disposition of the essential parts of the fuel feeding device as to permit of supplying the oxygen necessary for supporting the combustion of the hydrocarbons and fixed carbons separately and independently, giving each their due proportion at the proper instant and in a proper manner, and at the same time feeding the coal to the furnace continuously in such quantity as shall just correspond to the rate of combustion, the feed and air supply being at all times under easy control. Also, in so arranging the parts that the fuel is fed progressively forward and down the fixed grates to ash pit below, thus eliminating the difficulty inherent in stokers of this class, of keeping the fire clean.

It is also desirable, in operating re-heating and other metallurgical furnaces to be able to regulate the rate of combustion at the various points across the furnace hearth, so that the heating effect may be uniform throughout the heating chamber. I accomplish this desideratum by making the fuel feeder in units, using more or less units according to the width of the furnace, each being independently regulatable both as to the quantity of fuel supplied and amount of air admitted to the fire.

Figure 4:
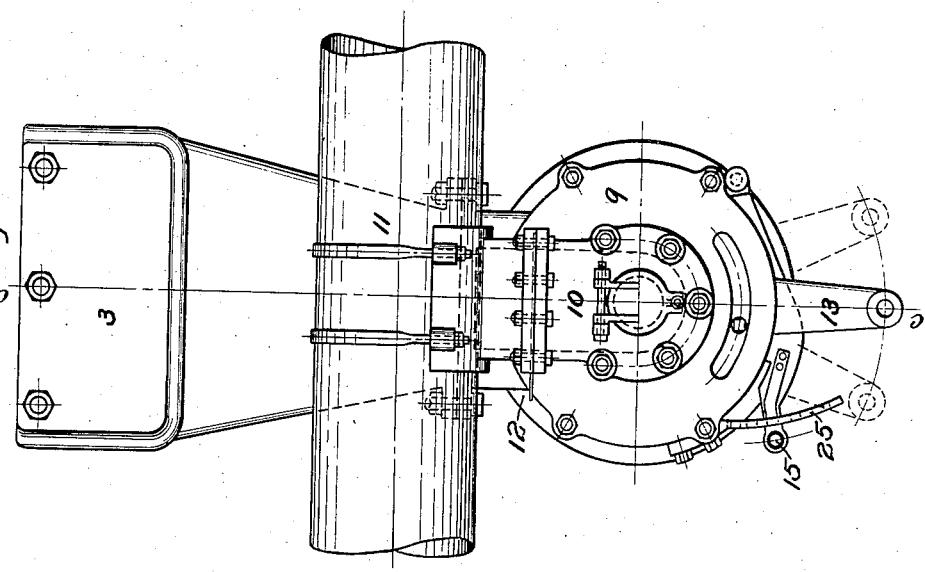

Referring to the drawings, Figure 1 is an end elevation of a re-heating furnace, showing three units of the fuel feeder, applied thereto. Fig. 2 is a sectional side elevation on line *a. a.* of Fig. 1, showing the relations of the fuel feeder, shelf plate, grates, ash pit, etc. Fig. 3 is a horizontal section on line *b. b.* Fig. 1, showing the pockets and three units in plan. Fig. 4 is an enlarged elevation of the fuel feeder. Fig. 5 is a logitudinal cross section. Figs. 6 and 7 are transverse cross sections, showing ratchet plate and fuel regulating device. Fig. 8 is a horizontal cross section on line *d. d. d. d. d.* of Fig. 7 showing ratchet plate and operating pawl. Fig. 9 is a side elevation and partial section of the screw conveyer. Fig. 10 is an end elevation showing the ratchet plate. Fig. 11 is an elevation of the vibrating arm for operating the screw conveyer. Fig. 12 is a section of the vibrating arm on line *f. f.* of Fig. 12. Fig. 13 is a longitudinal cross section of the cover plate, hollow spindle and twyer on line *e. e.* of Fig. 14. Fig. 14 is an elevation of the parts shown in Fig. 13 showing the face and openings of the twyer. Fig. 15 is an elevation of the regulating plate. Fig. 16 is a plan view of same. Fig. 17 is an elevation of the pawl for operating the ratchet plate, and Fig. 18 is a plan of the pawl.

Describing the mechanism and operation of my fuel feeder, reference being had to one unit only:—3 is a hopper to which is affixed at the lower end, an annular casing 4, partially open at the top and communicating with the hopper, one end of which is flanged for fastening to the furnace, of which 1 is the fire box having the doors 2, and the other end terminating in a recess for containing the operating mechanism. The cover plate 9, is rigidly bolted to the casing 4. Extending from the cover plate 9, concentric with the casing 4, is a hollow spindle 7, securely fastened to the cover 9, turned on its outer surface to receive the worm 5 and the ratchet plate 6. To the inner end of the hollow spindle is attached the twyer 8, the worm 5, and ratchet plate 6. The worm conveyer 5 is bored so as to revolve freely on the hollow spindle 7, and between the hub of the worm conveyer and the hub of the cover plate 9 there are interposed ball bearing rings 16 for eliminating the friction caused by forcing the fuel into the furnace.

On the hub of the cover 9 which carries the hollow spindle 7, is placed a vibrating arm or lever 13 which is journaled on the cover 9, and is free to oscillate, and carries the pawl or dog 14 which is held in contact with the ratchet plate by the spiral spring 24: Fig. 8. To the lower end of the vibrating lever 13 is attached a reciprocating bar 22 (Fig. 1), which is supported by the links 23—23 Fig. 1, and operated by any suitable means, as for instance, a revolving crank or a steam cylinder. The reciprocations of the bar 22 attached to the arms 13, causes the pawl 14 to give to the ratchet plate 6 and conveyer worm 5, an intermittent rotary motion. This motion, however, would cause all the fuel feeders to supply fuel equally, but since it is desirable to control the feed of each unit independently, I use the regulating plate 15 in the following manner: One end of the plate 15 is pivoted to the casing 4 and the other end is confined in a notched slot in the "segment" 25. The plate 15 is provided with a latch block 26 which fits into the notches in 25 and is held in place by the spring 27. The plate 15 is provided with a series of steps, marked in Fig. 7 g. h. k. l., and the notches in the segment 25. f. g'. h'. k'. l'. If the latch block 26 were in the notch f in the segment 25, the top edge of the plate 15 would be just below the periphery of the ratchet plate 6 permitting the pawl 14 to move the ratchet plate 6 the entire distance subtended by the arc due to the movement of the arm 13, (as for instance, four teeth on the plate 6). If the plate 15 were raised to the notch g' the step g. would be interposed between the pawl 14 and the ratchet plate 6 so as to prevent the pawl from dropping into the last tooth and, therefore, the ratchet plate 6 would only move a distance equal to the pitch of three teeth. With the latch of the plate 15 in the position shown at h' the ratchet plate will move but two teeth; when in k' but one tooth, and when in the position of l' the pawl 14 will drag over the plate 15 without moving the ratchet plate 6 or conveyer worm 5, thus giving the attendant complete control over the amount of fuel fed into the furnace by each unit.

Air, for supporting the combustion of the hydrocarbons, is admitted under pressure from a fan or other source of supply, through the blast main 11 and wind box 10, in which is a regulating slide 12, to the hollow spindle 7 and twyer 8.

In operating my fuel feeder the hopper 3 is filled with coal of such fineness as will readily pass by gravity to the conveyer casing 4, and surrounding the conveyer worm 5 which, when operated through media of the pawl 14—arm 13 and reciprocating bar 22, by reason of the action of the screw conveyer will cause the coal to be forced into the pockets 21, Fig. 3, and on the shelf 17, where, by reason of the upward inclination of the inner portion of the shelf, the coal will be forced to rise and pile itself up in front of the pocket 21, and at the same time the diverging sides of the twyer 8 will cause the coal to spread laterally, and where more than one fuel feeder is used in a furnace, join the coal of the adjacent pocket, making a continuous line or pile of coal across the entire fire box of the furnace. When the fire in the furnace is in full action the hydrocarbons contained in the coal will be distilled at a line approximately coinciding with a line projected from, and parallel with the top surface of the grate bar 20, continued to the wall of the furnace over the pockets 21, and the air, in such amount as may be determined by the position of the regulating slide 12 in the wind box 10, passing through the hollow spindle 7 to the twyer 8, where, because of the shape and disposition of the openings in the twyer, the air is compelled to spread and permeate the entire mass of coal in front of the pocket, and will be brought into intimate contact with the volatile gases at the point of dissociation, the mixture of gas and air being projected through the mass of incandescent coals above and beyond the zone of dissociation, heating the mixture to the point of ignition, wholly consuming the hydrocarbons and partially consuming the fixed carbons. The continuous operation of the fuel feeder will ultimately over fill the capacity of the shelf 17, when the partially consumed coal will be forced over the apex formed by the shelf and inclined grates, by the action of the conveyer worm assisted by the force of gravity progressing downward on the inclined grates 20, which are supported by the carrier bars 18 and 19, where the combustion of the fixed carbons will be continued and completed, finally passing over the lower end of the grates to the pit 24 below, in the form of ash. In the second stage where the fixed carbons are burned on the grates 20, the requisite oxygen to support combustion can be furnished either by natural draft, or by introducing a blast under pressure below the grates as circumstances may require.

The small doors 2—2 in the fire box 1 permit the attendant to observe the condition of the fire at all times.

The advantages of my invention will be appreciated by those skilled in the art, as the apparatus is simple, durable, and easily controlled with no moving parts exposed to the fire.

Having described my invention, I claim—

1. In combination with a furnace a fuel feeder comprising a hopper; a casing affixed thereto, and communicating therewith, one end of said casing opening into the furnace chamber in substantial alinement with the upper ends of inclined grate bars and provided at its opposite or outer end with a head; inclined grate bars in the furnace chamber; a hollow spindle affixed to the head of the casing and communicating with means for supplying air thereto and terminating at its inner end in a twyer; a screw conveyer rotatably mounted upon the hollow spindle; means for rotating the screw conveyer, and an inclined shelf between the screw conveyer and the inclined grate bars, whereby the hydrocarbons are distilled slowly and continuously in advance of the grate bars, and are supplied with a requisite quantity of oxygen for combustion independently of the supply for burning the fixed carbons.

2. In combination with a furnace provided with inclined grate bars, a fuel feeder comprising a gravity hopper; a casing affixed to the lower extremity of the hopper and communicating therewith and closed at its outer end by a cover; a hollow spindle centrally disposed in said casing and affixed at one end to the casing cover and terminating at its inner end in a pocket in the front wall of the furnace in front of the grate bars and perforated at its inner end; a screw conveyer rotatably mounted upon the hollow spindle; means for supplying air to the hollow spindle; and means for rotating the screw conveyer substantially as hereinbefore set forth.

3. In combination with a furnace a fuel feeder comprising a hopper; a casing affixed to said hopper and communicating therewith; a hollow spindle centrally disposed in said casing and affixed at one end to the outer face of said casing and terminating at the opposite or inner end in the furnace chamber; a screw conveyer rotatably mounted upon the hollow spindle and provided with a ratchet plate at its outer end; a vibrating arm journaled upon the outer face or cover of the casing and provided with a pawl adapted to engage with the ratchet plate; means for vibrating said arm, and a notched or stepped plate coöperating with said arm for controlling the relation of the pawl with the ratchet plate substantially as and for the purpose set forth.

4. In combination with a furnace a fuel feeding device comprising a hopper, a casing connected to and communicating therewith, a cover at the outer end of said casing and provided with a centrally disposed hollow air conveying spindle; a screw conveyer rotatably mounted upon the hollow air spindle and provided with a ratchet plate at its outer end; a vibrating arm provided with a pawl adapted for engagement with the ratchet plate; a notched or stepped plate for controlling the relation of the pawl with the ratchet plate; and means for holding said notched or stepped plate in different positions of adjustment.

5. In combination with a furnace a fuel feeding device comprising a hopper, a casing connected thereto and communicating therewith, a hollow air spindle connected with the casing and a screw conveyer rotatably mounted upon said spindle; a recess or pocket in the furnace in advance of the grate bars and wherein the fuel will mass in front of the inner end of the air conveying spindle substantially as and for the purpose set forth.

6. In combination with a furnace a fuel feeder comprising a hopper and casing such as described; a hollow air spindle secured to the casing and with a screw conveyer rotatably mounted thereon; means for operating and controlling the screw conveyer and means for supplying air to the hollow spindle; an inclined shelf intermediate the inner termini of the hollow spindle and screw conveyer and front end of the grate, whereby the fuel conveyed by the conveyer is caused to mass itself in front of the air supply conducted through the hollow spindle, substantially as and for the purpose hereinbefore set forth.

7. In combination with a furnace a fuel feeding device comprising a hopper; a casing connected to and communicating with said hopper; an air conveying spindle attached to said casing; a screw conveyer rotatably mounted upon the air spindle, said air spindle and screw conveyer terminating in advance of the grate bars whereby the fuel forced into the furnace chamber by the screw conveyer is delivered and massed in front of the inner end of the air conveying spindle substantially as hereinbefore set forth.

8. In a fuel feeder, having a magazine, a casing affixed thereto, an annular recess with a cover having a centrally disposed hollow spindle affixed thereto, a screw conveyer mounted on the hollow spindle, a ratchet plate affixed to said screw conveyer, a vibrating arm carrying a pawl journaled on said cover, the pawl adapted to engage the ratchet plate, and a notched or stepped plate pivoted at one end on the casing for the screw conveyer and the other end in a notched segment which will hold said plate in different positions of adjustment.

In testimony whereof, I have signed my name to this specification in the presence of two subscribing witnesses.

DAVID F. NISBET.

Witnesses:
ERNEST FRANCKE,
F. S. NISBET.